United States Patent [19]

de Putter

[11] 4,088,307
[45] May 9, 1978

[54] EXTRUDER WITH DEGASSING

[75] Inventor: Warner Jan de Putter, Hardenberg, Netherlands

[73] Assignee: Wavin B. V., Zwolle, Netherlands

[21] Appl. No.: 625,704

[22] Filed: Oct. 24, 1975

[30] Foreign Application Priority Data

Oct. 24, 1974 Netherlands .......................... 7413965

[51] Int. Cl.² ........................ B29B 1/10; B65G 33/08; B29F 3/02; B29F 3/03
[52] U.S. Cl. ..................................... 366/75; 198/625; 425/204; 425/208; 366/81; 366/83
[58] Field of Search ................................ 259/192–193, 259/104, 97, 40, 21, 6, 41, DIG. 7, DIG. 8; 425/204, 208; 198/213, 625

[56] References Cited

U.S. PATENT DOCUMENTS

| 3,252,182 | 5/1966 | Colombo | 259/192 |
| 3,764,114 | 10/1973 | Ocker | 259/192 |

Primary Examiner—Harvey C. Hornsby
Assistant Examiner—Robert Pous
Attorney, Agent, or Firm—Wigman & Cohen

[57] ABSTRACT

An extruder for synthetic material is disclosed which includes an extruder housing provided with at least two worm conveyer shafts, each having one or more helices thereon. An inlet opening is provided in the housing at the extruder input for introducing the synthetic material and a degassing outlet is provided in the housing downstream of the inlet. Intermediately of the material inlet and degassing outlet, distributing members are arranged on the worm shaft peripheries, the distributing members comprising intermeshing tooth-shaped heightened parts of generally hemispherical configuration.

6 Claims, 3 Drawing Figures

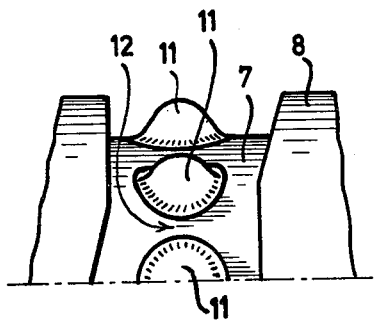
FIG: 2.
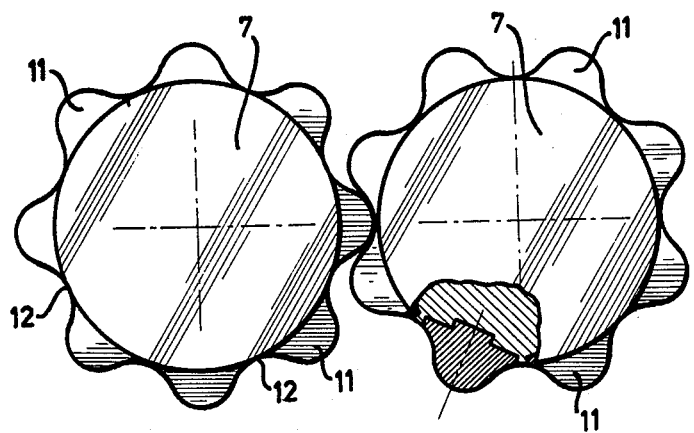
FIG: 3.

EXTRUDER WITH DEGASSING

BACKGROUND OF THE INVENTION

The invention relates to an extruder, comprising a housing with an inlet and at least two worm conveyors, consisting of a worm conveyor shaft and one or more helices provided thereon, an exhaust for the gases in the extruder housing, which as seen in the direction of transportation of the mixing worm conveyors is arranged beyond the inlet of the extruder, and a member for propelling and distributing the synthetic material, which member is located before the exhaust and on a part of the conveyor worm shaft that has no helices and which permits passage of the synthetic material in flow portions and subdivides the flow portions into smaller portions.

Such extruders in which a worm conveyor is provided with one or more helices are known per se. Within these known devices there is arranged a plate with apertures through which the mass plasticized by the conveyor mixing worms is pressed in flows which are cut into pieces by means of cutting members arranged on the mixing worms beyond the plate, while an exhaust leading to the outside is arranged for the discharge of the gases. Due to the connection of this exhaust to a vacuum pump a fast and proper de-aeration of the synthetic material can be obtained and as a consequence the processing capacity of an extruder can be considerably stepped up. This type of known device is typified by the screw-type plasticizer described in U.S. Pat. No. 3,407,438.

Such a device has the drawback that with such apertured plates or disks the jellifying effect in some synthetic materials is too great which impairs the processing of the materials. Especially in case of particular recipes it has been found that the jellification with the aforementioned plates is so great that good results cannot be obtained. Apart therefrom the maintenance of such an extruder is not easy, since it should be dismounted before the worms and plate with apertures can be removed from the extruding housing.

Another considerable drawback is that synthetic material can amass before the apertured plate, which causes the material to burn at that location and gives rise to a decrease in quality of the final product. Moreover, such a burning or combustion can make the dismounting of the extruder a matter of necessity, whereby in order to remove the apertured plate, as has been mentioned already, it is necessary to dismount the entire extruder housing which operation requires much labour.

SUMMARY AND OBJECTS OF THE INVENTION

It is an object of the invention to provide an extruder of the aforementioned type, whereby an optimal degassing is ensured without the risk of combustion of material while maintaining a simple construction of the extruder, so that the worms can be easily removed from the extruder housing without the necessity to dismount the extruder housing and to remove the apertured plates used in the known extruder.

This object is attained according to the invention by the arrangement of the distributing member for the synthetic material which consists of tooth-shaped heightened parts arranged on each conveyor worm shaft, and which in the space between the two worms cooperate at least partially with each other.

When such a distributing member consisting of tooth-shaped heightened parts is used a the synthetic material at the location of the distributing member is divided into various flow portions which on rotation of the tooth-shaped heightened parts, arranged on the conveyor worm shaft, are regularly subdivided, which can be subsequently degassed by suction of gases via the degassing exhaust.

It is of particular importance that the tooth-shaped heightened parts on the two conveyor worm shafts, which essentially constitute gear wheels also provide a proper mixing of the plasticized synthetic material. Moreover the material is rolled to a degree during the action of the tooth-shaped heightened parts on a flow of synthetic material, which mixing and rolling action contributes to an accelerated degassing and consequently to an improvement of the quality of the extruded material and to an increase of the capacity of the extruder.

In a particularly advantageous embodiment the tooth-shaped heightened parts have a flow promoting profile whereby the processing capacity of the extruder can be considerably increased without the risk of decrease in quality on account of insufficient degassing or combustion of the synthetic material.

The tooth-shaped heightened parts are advantageously constructed as uniform burl-shaped projections, which have an excellent flow promoting effect, while the height of the tooth-shaped heightened parts corresponds preferably to 95 to 100% of the tooth height of the helices. As a consequence a very good sealing is effected within the extruder, where the tooth-shaped heightened parts on the two worm shafts are opposite each other, and furthermore a proper cleaning of the walls of the extruder housing is obtained.

If desired the tooth-shaped heightened parts may have a height greater than the tooth height of the helices, whereby the tooth-shaped heightened parts cooperate with the inner wall of the extruder housing with a very small clearance therebetween.

It is, however, evident that in that case recesses in the conveyor worm shaft should be provided in such a fashion that the tooth-shaped heightened parts can be received therein during the rotation of the two worms.

The tooth-shaped heightened parts on the two conveyor worms shafts cooperate efficiently in a substantially sealing manner with each other. As a consequence the synthetic material is substantially conveyed along the wall of the extruder housing whereby an optimal degassing is ensured.

In order to obtain an excellent flow along the tooth-shaped heightened parts and an adequate cleaning thereof they are hemispherically configured, the hemispheric shape merging fluently into the shape and circumference of the conveyor worm shaft.

The invention is hereinafter clarified with reference to the drawings in which an embodiment of the invention is represented. In the drawings:

BRIEF DESCRIPTION OF THE DRAWINGS

FIG. 2 is a view in perspective of the mixing conveyor worm at the location of the burl-like heightened parts;

FIG. 3 is a section on the line III—III in FIG. 1.

DETAILED DESCRIPTION OF THE PREFERRED EMBODIMENT

Figure 1:
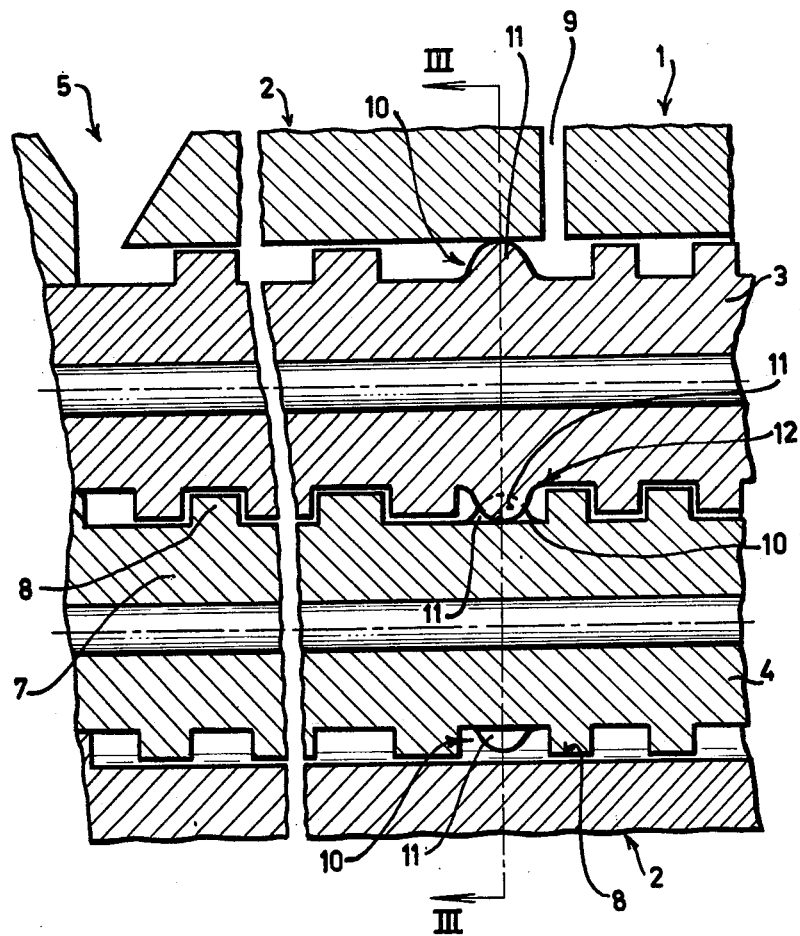
FIG. 1 is a diagrammatic view of the device according to the invention.

In FIG. 1 there is represented a part of an extruder comprising an extruder housing 2 which on its inner side is provided with a first mixing conveyor worm 3 and a second mixing conveyor worm 4.

The extruder is likewise provided with an inlet 5 opening into the extruder housing 2.

The first mixing conveyor worm 3 and the second conveyor worm 4 may be driven by means of a non-represented driving mechanism which, however, in this field of engineering is commonly known.

The mixing conveyor worm 4 can be seen as a conveyor worm shaft 7 and a helix 8 provided thereon which if desired may be a twin helix.

The extruder is likewise provided with a degassing outlet 9 in the extruder housing 2, which is connected to a vacuum pump (not shown). As is seen the degassing outlet 9 is arranged, as viewed in the direction of conveyance of the mixing conveyor worms, directly beyond the distributing member 10 for the plastic material. This distributing member consists of tooth-shaped heightened parts 11 arranged on the conveyor worm shafts and in the space between the two mixing conveyor worms cooperate with each other. FIG. 1 shows a full cooperation between the tooth-shaped heightened parts 11 disposed on the two mixing conveyor worms, whereby a sealing between the two mixing conveyor worms is obtained.

In use of the extruder the synthetic material plasticized by the conveyor worms 3, 4 is divided into flow portions by means of the tooth-shaped heightened parts 11, and these flow portions are regularly subdivided into smaller portions, by the pockets 12, since on rotation the tooth-shaped heightened parts cut up a flow portion and subject it partially to a rolling operation.

It has been found that this way of separating a part of a flow of synthetic material, passed from between two tooth-shaped heightened parts, together with the rolling operation performed on this part of the flow during the separation thereof has a very good effect on the degassing, whereby an optimal degassing at a fast rate is obtained.

In FIG. 2 there are represented tooth-shaped heightened parts 11 having a flow promoting profile which is obtained by shaping the tooth-shaped heightened parts as a hemisphere which fluently merges into the circumference of a conveyor worm shaft 7.

As is seen the tooth-shaped heightened parts 11 with a hemispherical configuration have a height which corresponds with 100% of the depth of the helices 8 of the mixing conveyor worms 3, 4.

By a suitable selection of the number of tooth-shaped heightened parts 11 the rate of jellification and the degassing can be controlled. Due to the tooth-shaped heightened parts on the two shafts, acting as gear wheels, there is produced an increased pressure and as a consequence an accelerated sintering together of the grains of synthetic material. Moreover the tooth-shaped heightened part 11 generate greater flow velocities at the intermeshing location thereof since the passage at such location is smaller and the material feed by the mixing conveyor worms is not changed.

It is also possible to use two rows of heightened parts 11 which are situated at small distance from each other on each shaft.

The suitable selection of the shape of the heightened parts, i.e. hemispherical, results in a self-cleaning action, whereby the extruders need be cleaned less frequently.

Another reason why cleaning can be performed at less frequent intervals is because of the fact that, contrary to the known devices, it is not necessary to use disk-shaped members behind which the material may amass and burn. Thus, the tooth-shaped heightened parts 11 which are used in the present extruder do not only convey the material, but achieve moreover a proper mixing thereof.

The height of the burl-shaped parts 11 is preferably equal to the depth of the helices of the conveyor worms 7. As a consequence the walls of the extruder housing are continuously cleaned, whereby such an extruder can operate for a greater period of time without the need to perform cleaning.

The use of a distributing member in the shape of the tooth-shaped heightened parts 11 permits reduction of the jellification area of an extruder whereby the length of the extruder housing may also be reduced. Due to the sintering together the synthetic powder is prevented from lodging in the degassing exhaust 9 to thereby give rise to clogging. It is obvious that instead of one distributing member in the shape of a row of tooth-shaped heightened parts 11, additional similarly configured distributing members, at other locations, could be disposed in the extruder.

What we claim is:

1. In an extruder for synthetic material comprising an extruder housing having a material inlet and a material outlet, at least two worm conveyors disposed in said housing, said conveyors comprising a worm conveyor shaft having at least one helix thereon, an exhaust outlet for the gases generated in the extruder housing, said exhaust outlet being arranged downstream of the material inlet, and at least one distributing member located in said housing upstream of the exhaust outlet for distributing the synthetic material, the improvement comprising said distributing member including tooth-shaped heightened parts constructed as uniform burl-shaped projections and arranged on the periphery of each worm conveyor shaft for promoting uniform flow of the material while also providing a self-cleaning effect of said parts, the heightened parts on one worm conveyor shaft intermeshing at least partially with the heightened parts of the other worm conveyor shaft in a space between the worm conveyors such that the flow of material along the heightened parts is regularly divided and subjected to a rolling action by said heightened parts.

2. The improvement according to claim 1 wherein said tooth-shaped heightened parts are provided with a flow-promoting profile.

3. The improvement according to claim 1 wherein the height of said tooth-shaped heightened parts is substantially equal to the tooth height of the helices of the worm conveyor shafts.

4. The improvement according to claim 1 wherein the tooth-shaped heightened parts of each worm conveyor shaft substantially sealingly intermesh with each other.

5. In an extruder for synthetic material comprising an extruder housing having a material inlet and a material outlet, at least two worm conveyors disposed in said housing, each conveyor comprising a worm conveyor shaft having a longitudinal axis and at least one helix arranged thereon, an exhaust outlet positioned downstream of the material inlet for exhausting the gases generated in the extruder housing and at least one distributing means in said extruder housing located upstream of the exhaust outlet for distributing the material, the improvement comprising said distributing means including tooth-shaped, substantially hemispherical heightened parts arranged about the periphery of each worm conveyor shaft in a transverse plane substantially perpendicular to the longitudinal axis of a respective shaft for promoting uniform flow of the material while also providing a self-cleaning effect of said parts, the transverse planes of each shaft being substantially coincident, the heightened parts of one worm conveyor shaft intermeshing at least partially with the heightened parts of the other worm conveyor shaft in a space between the worm conveyors.

6. In an extruder for synthetic material comprising an extruder housing having a material inlet and a material outlet, at least two worm conveyors disposed in said housing, said conveyors comprising a worm conveyor shaft having at least one helix thereon, an exhaust outlet for the gases generated in the extruder housing, said exhaust outlet being arranged downstream of the material inlet, and at least one distributing member located in said housing upstream of the exhaust outlet for distributing the synthetic material, the improvement comprising said distributing member including tooth-shaped heightened parts arranged on the periphery of each worm conveyor shaft, said parts being hemispherically shaped and fluently merging into the periphery of the worm conveyor shaft, the heightened parts on one worm conveyor shaft intermeshing at least partially with the heightened parts of the other worm conveyor shaft in a space between the worm conveyors such that the flow of material along the heightened parts is regularly divided and subjected to a rolling action by said heightened parts.

* * * * *

UNITED STATES PATENT AND TRADEMARK OFFICE
CERTIFICATE OF CORRECTION

PATENT NO. : 4,088,307
DATED : May 9, 1978
INVENTOR(S) : Warner Jan de Putter

It is certified that error appears in the above-identified patent and that said Letters Patent are hereby corrected as shown below:

Column 2, line 8, after "subdivided" insert --into smaller portions--.

Column 6, line 10, after "shaft" insert --for promoting uniform flow of the material while also providing a self-cleaning effect of said parts--.

Signed and Sealed this

Third Day of October 1978

[SEAL]

Attest:

RUTH C. MASON
*Attesting Officer*

DONALD W. BANNER
*Commissioner of Patents and Trademarks*